United States Patent
Cherepinsky et al.

(10) Patent No.: US 10,054,957 B2
(45) Date of Patent: Aug. 21, 2018

(54) HAPTIC FEEDBACK FOR REALTIME TRAJECTORY CONSTRAINTS

(71) Applicant: Sikorsky Aircraft Corporation, Stratford, CT (US)

(72) Inventors: Igor Cherepinsky, Sandy Hook, CT (US); Harshad S. Sane, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/507,113

(22) PCT Filed: Sep. 15, 2015

(86) PCT No.: PCT/US2015/050172
§ 371 (c)(1),
(2) Date: Feb. 27, 2017

(87) PCT Pub. No.: WO2016/048713
PCT Pub. Date: Mar. 31, 2016

(65) Prior Publication Data
US 2017/0285662 A1    Oct. 5, 2017

Related U.S. Application Data

(60) Provisional application No. 62/053,359, filed on Sep. 22, 2014.

(51) Int. Cl.
*G05D 1/10* (2006.01)
*G06F 3/0484* (2013.01)
(Continued)

(52) U.S. Cl.
CPC ............ *G05D 1/101* (2013.01); *B64C 13/00* (2013.01); *G06F 3/0484* (2013.01);
(Continued)

(58) Field of Classification Search
CPC .... G05D 1/101; G06F 3/0484; G08G 5/0021; G08G 5/0034; G08G 5/0039; G08G 5/0047
(Continued)

(56) References Cited

U.S. PATENT DOCUMENTS 6,128,554 A     10/2000  Damotte
2008/0103639 A1  5/2008  Troy et al.
(Continued)

OTHER PUBLICATIONS

International Search Report and Written Opinion of the International Search Authority dated Dec. 10, 2015 in related PCT Application No. PCT/US2015/050172, 8 pages.
(Continued)

*Primary Examiner* — Marthe Y Marc-Coleman
(74) *Attorney, Agent, or Firm* — Cantor Colburn LLP

(57) ABSTRACT

A system for receiving feedback in a flight plan of a vehicle includes a haptic-enabled device comprising a crew seat with an inceptor mounted thereto; and a processor with memory having instructions stored thereon that, when executed by the processor, cause the system to: receive signals indicative of the flight plan for the vehicle; receive deviation signals indicative of a proposed deviation in a trajectory for the flight plan; and transmit signals to the haptic-enabled device representing trajectory constraints in the proposed deviation in response to the receiving of the deviation signals.

10 Claims, 3 Drawing Sheets

(51) Int. Cl.
*G08G 5/00* (2006.01)
*B64C 13/00* (2006.01)

(52) U.S. Cl.
CPC ......... *G08G 5/0021* (2013.01); *G08G 5/0034* (2013.01); *G08G 5/0039* (2013.01); *G08G 5/0047* (2013.01)

(58) Field of Classification Search
USPC .......................................................... 701/533
See application file for complete search history.

(56) References Cited

U.S. PATENT DOCUMENTS

| | | |
|---|---|---|
| 2009/0266939 A1 | 10/2009 | Hanlon et al. |
| 2009/0302171 A1 | 12/2009 | Wilkens |
| 2013/0124076 A1* | 5/2013 | Bruni .................. G08G 5/0095 701/120 |
| 2014/0138492 A1 | 5/2014 | Van Staagen |

OTHER PUBLICATIONS

Supplementary European Search Report for Application No. 15843757.4; dated Apr. 18, 2018; 8 pages.

* cited by examiner ical Application No. 62/053,359, filed on Sep. 22, 2014, the contents of which are incorporated by reference herein in their entirety.

HAPTIC FEEDBACK FOR REALTIME TRAJECTORY CONSTRAINTS

CROSS-REFERENCE TO PRIOR APPLICATIONS

The present application is a 371 National Stage of International Application No. PCT/US15/50172, filed on Sep. 15, 2015, which claims priority to U.S. Provisional Application No. 62/053,359, filed on Sep. 22, 2014, the contents of which are incorporated by reference herein in their entirety.

BACKGROUND

The subject matter disclosed herein relates generally to the field of vehicle controls and to a system for providing haptic-enabled cues on real-time trajectory constrains for a vehicle.

DESCRIPTION OF RELATED ART

When in flight, an aircraft may be oriented about a plurality of axes. The aircraft's orientation may also be referred to as aircraft state. In both fixed wing and rotary wing aircrafts, it is common for the pilot to use a variety of positionable controls including sticks, levers, collective, and rudder pedals to control aircraft state including attitude, altitude, speed, and the like. Commonly referred to as "sticks", these inceptors can be used to adjust control surfaces of the aircraft. As highly augmented optionally piloted aircraft emerge, a new way to interact with these aircraft is needed to perform mission goals. Existing interfaces are no longer sufficient to perform mission goals and allow human operators to manipulate aircraft trajectory and cue an operator for potential trajectory limitations. A system for manipulating aircraft trajectory and providing haptic feedback to the operator would be well received in the art.

BRIEF SUMMARY

According to an aspect of the invention, a system for receiving feedback in a flight plan of a vehicle includes a haptic-enabled device comprising a crew seat with an inceptor mounted thereto; and a processor with memory having instructions stored thereon that, when executed by the processor, cause the system to: receive signals indicative of the flight plan for the vehicle; receive deviation signals indicative of a proposed deviation in a trajectory for the flight plan; and transmit signals to the haptic-enabled device representing trajectory constraints in the proposed deviation in response to the receiving of the deviation signals.

In addition to one or more of the features described above, or as an alternative, further embodiments could include the processor configured to receive information related to one or more trajectories in the flight plan.

In addition to one or more of the features described above, or as an alternative, further embodiments could include the haptic-enabled device configured to receive haptic-force feedback in response to the proposed deviation in the trajectory.

In addition to one or more of the features described above, or as an alternative, further embodiments could include the haptic-force feedback include audible signals or force signals to the inceptor.

In addition to one or more of the features described above, or as an alternative, further embodiments could include wherein the haptic-enabled device is configured to receive haptic-force feedback in response to the proposed deviation based on one or more of a trajectory constraint and obstacles in an environment for the vehicle.

In addition to one or more of the features described above, or as an alternative, further embodiments could include the trajectory constraints include soft constraints and hard constraints.

In addition to one or more of the features described above, or as an alternative, further embodiments could include the soft constraints includes fuel efficiency and time for a mission.

According to another aspect of the invention a method for receiving feedback on a flight plan of a vehicle includes receiving, with a processor, signals indicative of the flight plan for the vehicle; receiving, with the processor, deviation signals indicative of a proposed deviation in a trajectory for the flight plan; and transmitting, with the processor, signals to the haptic-enabled device representing trajectory constraints in the proposed deviation in response to the receiving of the deviation signals.

In addition to one or more of the features described above, or as an alternative, further embodiments could include receiving information related to one or more trajectories in the flight plan.

In addition to one or more of the features described above, or as an alternative, further embodiments could include the processor configured to provide haptic-force feedback to the haptic-enabled device in response to the proposed deviation in the trajectory.

In addition to one or more of the features described above, or as an alternative, further embodiments could include the processor configured to provide the haptic-force feedback as audible signals or force signals.

In addition to one or more of the features described above, or as an alternative, further embodiments could include the processor configured to provide the haptic-force feedback in response to the proposed deviation based on one or more of a trajectory constraint and obstacles in an environment for the vehicle.

In addition to one or more of the features described above, or as an alternative, further embodiments could include the trajectory constraints include soft constraints and hard constraints.

In addition to one or more of the features described above, or as an alternative, further embodiments could include the soft constraints include fuel efficiency and time for a mission.

Technical function of the one or more claims described above include providing a rapid way to provide information to an operator on a trajectory for a vehicle in response to various trajectory constraints, reduces the reliance on display technology and provides a more intuitive interface. The invention may be implemented in an aircraft whose trajectory is being monitored, in a ground control station to monitor a trajectory of an aircraft in flight, or in a second aircraft that is monitoring a trajectory of a first aircraft.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
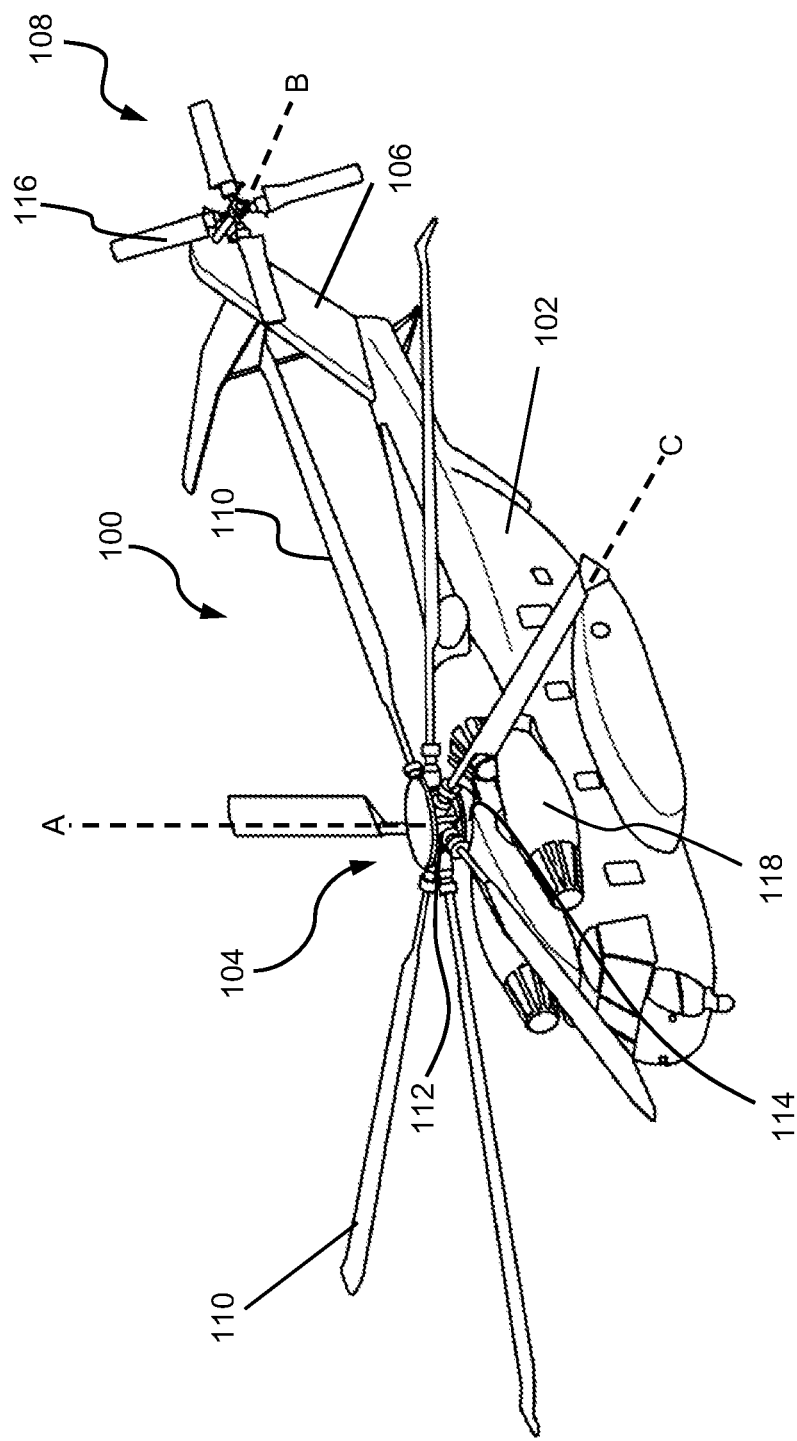
FIG. 1 is a schematic view of an example vehicle in accordance with an embodiment of the invention.

Referring now to the drawings, FIG. 1 illustrates a general perspective view of an exemplary vehicle in the form of a vertical takeoff and landing (VTOL) rotary-wing helicopter or aircraft 100 for use with a haptic feedback subsystem (FIG. 3) in accordance with an embodiment of the invention. In an embodiment, aircraft 100 is an optionally piloted vehicle and can autonomously determine aircraft states as it traverses a flight plan. A haptic-enabled device 312 (FIG. 3) can be used as a haptic-force feedback interface to receive haptic cues on a deviation in a trajectory for flight path of aircraft 100 in real-time based on aircraft constraints associated with the deviation in trajectory. Aircraft 100 includes an airframe 102 having a main rotor 104 and an extending tail 106 which mounts an anti-torque system, such as a tail rotor 108. In embodiments, the anti-torque system may include a translational thrust system, a pusher propeller, a rotor propulsion system, or similar. The main rotor 104 includes a plurality of rotor blades 110 mounted to a rotor hub 112 that rotates about rotor axis A, while tail rotor 108 includes a plurality of rotor blades 116 that rotates about axis B. Main rotor 104 is connected to a conventional swashplate 114 which is driven by one or more control servos to move and/or tilt the swashplate 114 with respect to the rotor axis A. For example, swashplate 114 may be commanded to move along rotor axis A so as to cause the blades 110 to vary pitch collectively relative to a blade axis C. Also, tilting of swashplate 114 either longitudinally or laterally relative to the axis A will cause the blades 110 to pitch cyclically in respective longitudinal or lateral directions relative to the blade axis C. Main rotor 104 and tail rotor 108 are driven to rotate by one or more engines 118 through one or more gearboxes (not shown). Although a particular helicopter is illustrated and described in the disclosed embodiment, it will be appreciated that other configurations and/or machines include autonomous and optionally piloted aircraft that may operate in land or water including fixed-wing aircraft, rotary-wing aircraft, and land vehicles (e.g., trucks, cars, etc.) may also benefit from embodiments disclosed.

Figure 2:
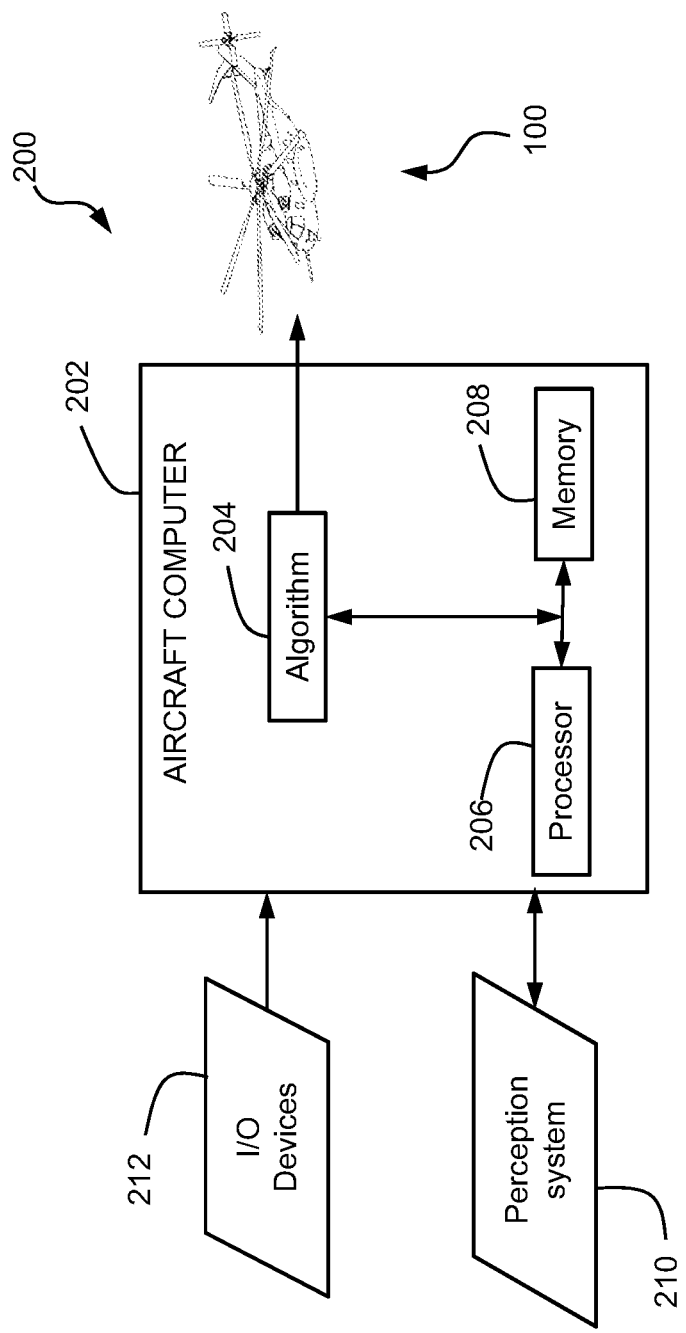
FIG. 2 is a schematic view of an example computing system in accordance with an embodiment of the invention.

FIG. 2 illustrates a schematic block diagram of a control system 200 (for aircraft 100) according to an exemplary embodiment. As illustrated, control system 200 executes one or more algorithms 204 for providing haptic-force feedback to an operator of a haptic-enabled device 312 (FIG. 3) based on manipulation of a trajectory point that is associated with a flight plan for aircraft 100 for a present aircraft location or at an aircraft location at a future time. A flight plan, which supports the mission goals, has a plurality of waypoints and includes a trajectory between the plurality of waypoints. Control system 200 includes a computing system such as an aircraft computer 202 having one or more processors and memory to implement algorithm 204 of aircraft 100. Aircraft computer 202 includes a memory 208. Memory 208 stores algorithm 204 as executable instructions that is executed by processor 206. The instructions may be stored or organized in any manner and at any level of abstraction, such as in connection with the execution of algorithm 204. Processor 206 may be any type of processor, including a central processing unit ("CPU"), a graphics processing unit ("GPU"), a general purpose processor, a digital signal processor, a microcontroller, an application specific integrated circuit ("ASIC"), a field programmable gate array ("FPGA"), or the like. Also, in embodiments, memory 208 may include random access memory ("RAM"), read only memory ("ROM"), or other electronic, optical, magnetic, or any other computer readable medium onto which is stored algorithm 204.

Aircraft 100 includes a perception system 210 having one or more sensors associated with one or more acquisition devices for capturing state information or positional information for aircraft 100. In embodiments, perception system 210 can be a navigation system such as, for example, a global positioning system ("GPS") or an inertial measurement unit ("IMU") that can be used to acquire positional data and trajectory information related to a current location and acceleration of aircraft 100 and can be used to determine a geographic location of aircraft 100 including a change from the initial position of aircraft 100, sensors associated with a vision system such as cameras, light detection and ranging scanner ("LIDAR"), laser detection and ranging scanner ("LADAR"), and radio communications such as air data scanner, instrument landing system ("ILS") and radio navigation, or the like.

Aircraft 100 includes input/output devices ("I/O") 210. The I/O devices 210 may include haptic-enabled device 312 (FIG. 3), a display device or screen, audio speakers, a graphical user interface ("GUI"), etc. In embodiments, I/O devices 210 can be used to control a trajectory of an aircraft, e.g., aircraft 100, and may be located within the aircraft whose trajectory is being controlled, either in the cockpit or cabin; can be located in a ground control station to control a trajectory of an aircraft in flight; or can be located in an aircraft in flight to control a trajectory of another independent aircraft also in flight such as, for example, between aircraft in a coordinated mission. In addition to the embodiments above, or as an alternative, further embodiments could include controlling trajectories for piloted vehicles or optionally piloted vehicles. In some embodiments, the I/O devices 210 may be used to enter or adjust a linking between data or sets of data. It is to be appreciated that the system 100 is illustrative. In some embodiments, additional components or entities not shown in FIG. 2 may be included. In some embodiments, one or more of the components or entities may be optional. In some embodiments, the components or entities of the system 100 may be arranged or configured differently from what is shown in FIG. 3.

Figure 3:
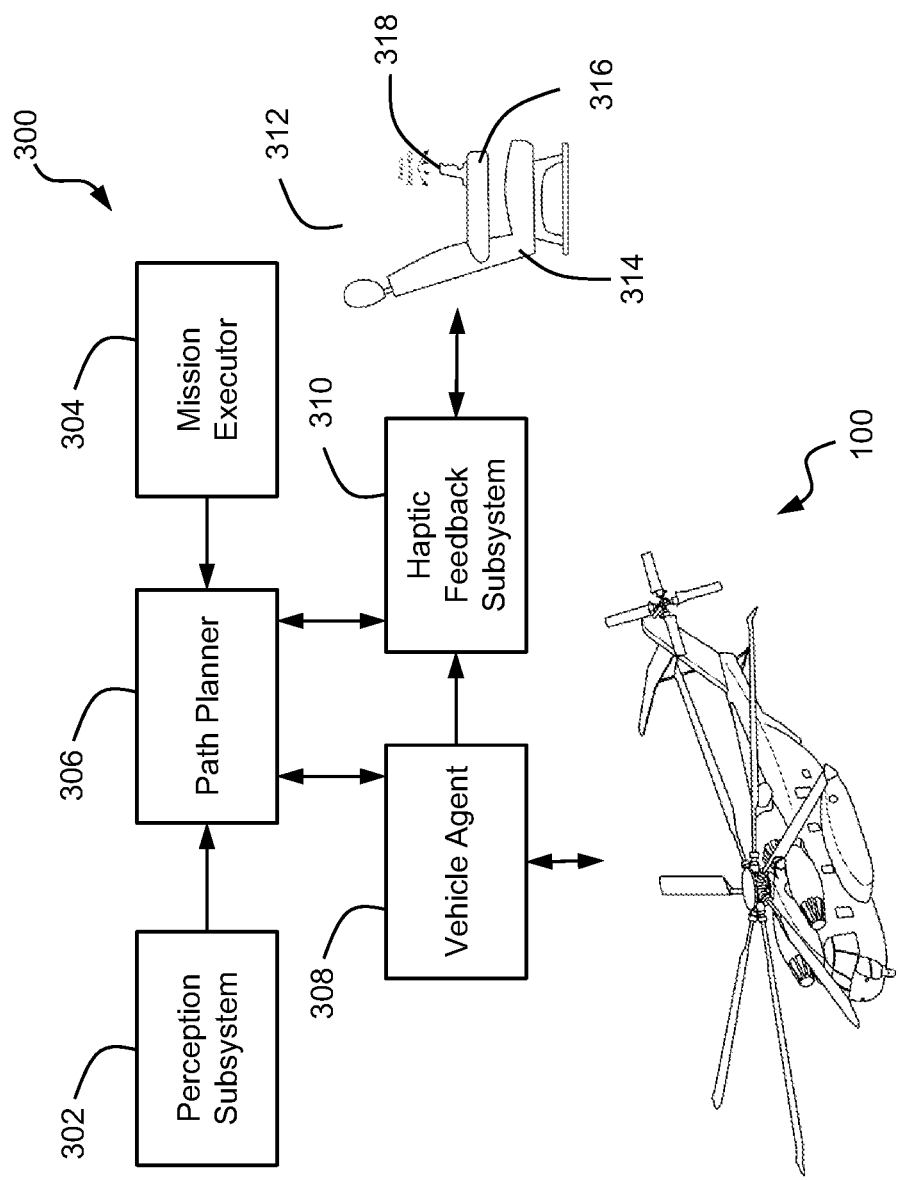
FIG. 3 is a schematic view of a control system for providing haptic-force feedback of a trajectory in accordance with an embodiment of the invention.

FIG. 3 illustrates a schematic view of a control system 300 for implementing algorithm 204 (FIG. 2) that provides haptic-force feedback of a trajectory of aircraft 100 in accordance with an embodiment of the invention. Algorithm 204 (FIG. 2) is implemented by processor 206 (FIG. 2) and, as such, FIG. 2 is also referenced in the description of control system 300.

As illustrated in FIG. 3, sensor data associated with a perception subsystem 302 is received by aircraft computer 202. In an embodiment, perception subsystem 302 is related to one or more sensors in perception system 210 of FIG. 2, which acquires information related to an environment of aircraft 100. The sensor data acquired by perception system 210 may be low-quality due to variations in lighting, distance, and may be processed by image enhancement algorithms such as edge preserving de-noising, contrast enhancement, and sharpening before further processing by processor 206. Aircraft computer 202 also receives information related to a flight plan in a mission for aircraft 100 from mission executor 304. Information for the mission may include traversing between a number of waypoints in a series of mission locations, e.g., locations A, B, and C, in a mission space. Information for the mission may be pre-loaded into aircraft 100 or can be received from a ground control station and/or from a field user or operator in communication with aircraft 100. Information from perception subsystem 302 and mission executor 304 is received by path planner 306 for determination of an optimal trajectory. The optimal trajectory may be based on in-flight configurations and/or constraints or obstacles of aircraft 100. Exemplary in-flight configurations can include minimizing fuel, minimizing time, or the like. Exemplary constraints or obstacles can include local threats or obstacles such as, e.g., no-fly zone areas, obstacles, or threats in a mission space of aircraft 100.

Path planner 306 can autonomously determine an optimal/feasible trajectory for a flight plan based on mission and perception data received by aircraft computer 202. The feasible trajectory may include flight instructions that instruct aircraft 100 to fly between a number of waypoints in the flight plan). For instance, a waypoint may be, without limitation, a location, a point of interest, a target, a specific set of coordinates (e.g., latitude and longitude) and/or a desired velocity and attitude of aircraft 100 at a specific set of coordinates. Vehicle agent 308 receives the optimal trajectory for aircraft 100 from path planner 306 and determines information related to flight controls for manipulation of servos and actuators in order to control aircraft 100 as it traverses the optimal trajectory. Vehicle agent 308 determines vehicle attitude commands based on the optimal trajectory and location of the aircraft 100 in relation to that optimal trajectory. The vehicle agent 308 determines actual flight control command signals, e.g., pitch, roll, and yaw commands that adjust directional surfaces and power on aircraft 100 in order to maneuver the aircraft 100 in order to stay on the optimal trajectory. In an example, vehicle agent 308 utilizes actual vehicle position, angular rate, and acceleration rate or the like together with the optimal trajectory in order to determine vehicle attitude commands required for flight augmentation of aircraft 100.

Haptic feedback subsystem 310 receives flight control data from vehicle agent 308 and signals from a haptic-enabled device 312 for controlling aircraft trajectory and can provide haptic-force feedback to an operator associated with haptic-enabled device 312. Haptic-enabled device 312, in an embodiment, can be styled as a crew seat with an integrated inceptor system for controlling aircraft trajectory between the plurality of waypoints at a present or future time period in the mission space. Inceptor system can include one or more inceptors 318 that is configured to be mounted on crew seat 314 and to be accessible from a seat arm 316 of crew seat 314. Inceptor 318 may be movable through several degrees of freedom as the operator manipulates the inceptor 318 to revise a trajectory (or proposed deviation in a trajectory) of aircraft 100. Inceptor 318 provides dynamic feedback to an operator through haptic-force feedback (i.e., tactile cues) representing trajectory constraints through one or more feedback components such as a servo or actuator positioned within seat arm 316. In an embodiment, an operator of haptic-enabled device 312 can receive feedback in the form of trajectory constraints from haptic feedback subsystem 310 as the operator manipulates a trajectory for aircraft 100. For example, as the operator moves a trajectory point to a new location, haptic feedback subsystem 310 can provide feedback cues, through haptic-enabled device 312, to an operator as audio or tactile cues related to soft constraints, or hard constraints. Soft constraints include fuel efficiency, time, or the like for implementing a revised flight plan associated with a mission, and hard-constraints include threats, obstacles in an aircraft environment, and constraints in vehicle performance such as roll, pitch, and yaw. As the operator moves the trajectory point for the flight plan around in the mission space, haptic feedback subsystem 310 may provide haptic-force feedback as "soft-bumps", force "chirps", or other tactile cues to inceptor 318 in order to provide feedback to operator based on his/her manipulation of a trajectory. The operator may feel "soft bumps" or additional force on the inceptor 318 as he/she manipulates the trajectory that relates to soft constraints. However, operator may receive a "hard stop" of inceptor 318 for a hard constraint where the inceptor 318 may not be moved further in a particular direction representing associated limits for aircraft performance. In an embodiment, an operator may select a revised trajectory with inceptor 318. Information for the revised trajectory may be received by path planner 306, which recalculates a flight plan based on the revised trajectory. The path planner 306 may determine costs, e.g., additional fuel or time, associated with the revised trajectory and provide this information to haptic feedback subsystem 310.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for receiving feedback in a flight plan of a vehicle, comprising:
a haptic-enabled device comprising a crew seat with an inceptor mounted thereto; and
a processor with memory having instructions stored thereon that, when executed by the processor, cause the system to:
receive signals indicative of the flight plan for the vehicle;
receive deviation signals indicative of a proposed deviation in a trajectory for the flight plan; and
transmit signals to the haptic-enabled device representing trajectory constraints in the proposed deviation in response to the receiving of the deviation signals, wherein the trajectory constraints include soft constraints including at least one of fuel efficiency and time for a mission.

2. The system of claim 1, wherein the processor is configured to receive information related to one or more trajectories in the flight plan.

3. The system of claim 1, wherein the haptic-enabled device is configured to receive haptic-force feedback in response to the proposed deviation in the trajectory.

4. The system of claim 3, wherein the haptic-force feedback include audible signals or force signals to the inceptor.

5. The system of claim 1, wherein the haptic-enabled device is configured to receive haptic-force feedback in response to the proposed deviation based on one or more of a trajectory constraint and obstacles in an environment for the vehicle.

6. A method for receiving feedback on a flight plan of a vehicle, comprising:
    receiving, with a processor, signals indicative of the flight plan for the vehicle;
    receiving, with the processor, deviation signals indicative of a proposed deviation in a trajectory for the flight plan; and
    transmitting, with the processor, signals to a haptic-enabled device representing trajectory constraints in the proposed deviation in response to the receiving of the deviation signals, the trajectory constraints including soft constraints including at least one of fuel efficiency and time for a mission.

7. The method of claim 6, further comprising receiving information related to one or more trajectories in the flight plan.

8. The method of claim 6, wherein the processor is configured to provide haptic-force feedback to the haptic-enabled device in response to the proposed deviation in the trajectory.

9. The method of claim 8, wherein the processor is configured to provide the haptic-force feedback as audible signals or force signals.

10. The method of claim 8, wherein the processor is configured to provide the haptic-force feedback in response to the proposed deviation based on one or more of a trajectory constraint and obstacles in an environment for the vehicle.

* * * * *